(12) United States Patent
Kim et al.

(10) Patent No.: US 10,710,644 B2
(45) Date of Patent: Jul. 14, 2020

(54) BODY FLOOR OF VEHICLE

(71) Applicants: Hyundai Motor Company, Seoul (KR); Kia Motors Corporation, Seoul (KR)

(72) Inventors: Hyun Sik Kim, Seoul (KR); Byeong Cheon Lee, Seoul (KR); Hee Seouk Chung, Gyeonggi-do (KR); Deok Hwa Hong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 85 days.

(21) Appl. No.: 16/197,708

(22) Filed: Nov. 21, 2018

(65) Prior Publication Data

US 2020/0079437 A1    Mar. 12, 2020

(30) Foreign Application Priority Data

Sep. 11, 2018  (KR) .......................... 10-2018-0108061

(51) Int. Cl.
*B62D 25/20*   (2006.01)
*B60N 2/005*   (2006.01)
(Continued)

(52) U.S. Cl.
CPC ......... *B62D 25/2027* (2013.01); *B60N 2/005* (2013.01); *B60N 2/015* (2013.01);
(Continued)

(58) Field of Classification Search
CPC ........ B60N 2/005; B60N 2/015; B62D 21/03; B62D 25/025; B62D 25/20; B62D 25/2027; B62D 25/2036; B62D 29/008
(Continued)

(56) References Cited

U.S. PATENT DOCUMENTS 4,685,716 A * 8/1987 Kondo ..................... B60N 2/06
                                                    296/63
5,641,194 A * 6/1997 Honma ................ B62D 21/157
                                                    296/187.12

(Continued)

FOREIGN PATENT DOCUMENTS

JP          6-321139       11/1994
JP       2003200857 A       7/2003
(Continued)

*Primary Examiner* — Jason S Daniels
(74) *Attorney, Agent, or Firm* — Mintz Levin Cohn Ferris Glovsky and Popeo, P.C.; Peter F. Corless (57) ABSTRACT

A body floor of a vehicle includes seat rails having seats mounted to the seat rails, a center floor including center side members provided on opposite sides of a tunnel member and a center cross-member connecting the center side members to the tunnel member, a rear floor having a rear side member connected to the center side members, a side reinforcement member provided between the center cross-member and the rear floor to cover the center side members and the rear side member, and a center reinforcement member provided between the center cross-member and the rear floor to cover the tunnel member, where rigidity of peripheral parts of the center floor, the rear floor, and the tunnel member is ensured by the side reinforcement member and the center reinforcement member, and the center floor and the rear floor provide an installation structure for the seat rails.

17 Claims, 5 Drawing Sheets

(51) Int. Cl.
*B62D 21/03* (2006.01)
*B62D 29/00* (2006.01)
*B60N 2/015* (2006.01)

(52) U.S. Cl.
CPC ............ *B62D 21/03* (2013.01); *B62D 25/20* (2013.01); *B62D 29/008* (2013.01)

(58) Field of Classification Search
USPC ............ 296/187.08, 187.12, 193.07, 203.03
See application file for complete search history.

(56) References Cited

U.S. PATENT DOCUMENTS

| | | | |
|---|---|---|---|
| 7,434,871 B2 * | 10/2008 | Mizuma | B60N 2/015 296/193.07 |
| 8,973,979 B2 | 3/2015 | Oezkan et al. | |
| 10,131,381 B2 * | 11/2018 | Ashraf | B60K 1/04 |
| 10,300,948 B2 * | 5/2019 | Ashraf | B62D 27/023 |
| 2018/0065675 A1 * | 3/2018 | Maier | B62D 21/152 |

FOREIGN PATENT DOCUMENTS

| | | |
|---|---|---|
| JP | 2004352080 A | 12/2004 |
| JP | 4060426 B2 | 3/2008 |
| JP | 2018058403 A | 4/2018 |
| KR | 10-2014-0080545 A | 6/2014 |
| WO | 2013076818 A1 | 5/2013 |

* cited by examiner

BODY FLOOR OF VEHICLE

CROSS REFERENCE TO RELATED APPLICATION

The present application claims under 35 U.S.C. § 119(a) the benefit of Korean Patent Application No. 10-2018-0108061, filed Sep. 11, 2018, the entire contents of which are incorporated by reference herein.

BACKGROUND

(a) Technical Field

The present disclosure generally relates to a body floor of a vehicle having seat rails provided thereon for moving seats.

(b) Description of the Related Art

Generally, a structure of a floor of a vehicle includes a front floor supporting a driver's seat and a passenger seat, a center floor supporting rear seats, and a rear floor including a trunk room to which a fuel tank is fixed. A floor structure of the vehicle includes a tunnel member integrally provided with a muffler pipe for passing the muffler pipe therethrough, and each floor includes various members so as to ensure the rigidity of the entire floor structure.

Generally, seats in a vehicle are configured to slidably move on a body floor via seat rails, and in particular, for rear seats to slidably move on the body floor, it is necessary to install an additional structure on the body floor for installing the seat rails. In particular, the additional structure is required merely to install the seat rails, thus increasing the number of parts, resulting in higher manufacturing costs.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a body floor of a vehicle, wherein a structure for installing seat rails is provided and rigidity of the entire body floor is ensured.

In order to achieve the above object, according to one aspect of the present disclosure, there is provided a body floor of a vehicle including seat rails having seats mounted thereto, the body floor including: a center floor including center side members provided on opposite sides of the center floor, a tunnel member provided between the center side members in forward/rearward directions, and center cross-member extending so as to allow each of the center side members to be connected to the tunnel member and having a first seat rail and a second seat rail each mounted to the center cross-member; a rear floor arranged on a rear of the center floor, the rear floor having a rear side member connected to the center side members and being connected to the tunnel member; a side reinforcement member provided between the center cross-member and the rear floor so as to cover the center side members and the rear side member, the side reinforcement member extending between the center cross-member and the rear floor so as to allow the center cross-member and the first seat rail to be mounted to the side reinforcement member; and a center reinforcement member provided between the center cross-member and the rear floor so as to cover the tunnel member, the center reinforcement member extending to the side reinforcement member so as to allow the center cross-member and the second seat rail to be mounted to the center reinforcement member.

The center floor and the rear floor may be connected to each other by a kickup member, the kickup member is connected to the rear floor by extending in an inclined manner from a rear end portion of the center floor to a rear of the body floor, and the center floor and the rear floor may have different heights.

The side reinforcement member may include: a body part extending in forward/rearward directions so as to cover one of the center side members and the rear side member; and a mounting part extending from the body part to an area positioned between the center cross-member and the kickup member and having the first seat rail mounted thereto.

The body part may extend to cover the one of the center side members by extending up to a portion at which the body part is connected to the center cross-member, with a support groove being provided in the body part so as to surround the center cross-member while the body part is mounted to the one of the center side members and the rear side member.

The body part may include a reinforcement part provided therein by protruding therefrom to an inner side of a vehicle body so as to have an inner space in the reinforcement part, with a protruding surface of the reinforcement part being open, wherein the reinforcement part includes support ribs intersecting with each other in the inner space.

The reinforcement part may be configured to protrude to the inner side of the vehicle body and extend so as to cover predetermined portions of the center floor, the rear floor, and the kickup member.

The support ribs may include main ribs extending in forward/rearward directions of the body floor according to a shape of the reinforcement part, and assistant ribs extending from the main ribs in vertical directions so as to be combined with inner surfaces of the reinforcement part.

A mounting part may be configured in a polygon shape having a flat surface at an upper end thereof and has the same height as a height of the center cross-member.

The center cross-member may include mount holes provided thereon, wherein the seat rails may be mounted to the mount holes, and a mounting part may include fixing holes provided thereon, the fixing holes being arranged to be in alignment with the mount holes, whereby the first seat rail may be mounted to the mount holes and the fixing holes.

The center reinforcement member may be configured to cover the tunnel member between the center cross-member and the kickup member, the center reinforcement member including a cover part provided thereon to be in contact with an inclined surface of the kickup member and combination parts extending to the center side members positioned on opposite sides of the cover part from the cover part and being in contact with the center floor.

A lower end portion of the cover part may be outwardly bent so as to have a lower-end contact part thereof being in contact with the center floor.

A rear end portion of the cover part may be outwardly bent so as to have a rear-end contact part thereof being in contact with the inclined surface of the kickup member.

Each of the combination parts may be configured to have an inner space provided therein and includes reinforcement ribs provided in the inner space, the reinforcement ribs extending to intersect with each other in the inner space.

Each of the combination parts may be configured to have a flat surface at an upper surface thereof and have the same height as a height of the center cross-member.

The center cross-member may include mount holes provided thereon to which the seat rails are mounted, and each of the combination parts may include combination holes provided thereon to be arranged in alignment with the mount holes, so that the second seat rail is mounted to the mount holes and the combination holes.

The side reinforcement member and the center reinforcement member include flat surfaces that are in contact with the center floor.

The side reinforcement member and the center reinforcement member may be made of aluminum.

The body floor of a vehicle having the structure mentioned above allows rigidity of peripheral parts of the center floor, the rear floor, and the tunnel member to be ensured by the side reinforcement member and the center reinforcement member, and the center floor and the rear floor thereof provide the installation structure of the seat rails, which simplifies the structure of the body floor, thereby decreasing the number of parts and manufacturing costs.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, a body floor of a vehicle according to an exemplary embodiment of the present disclosure will be described in detail with reference to the accompanying drawings.

Figure 1:
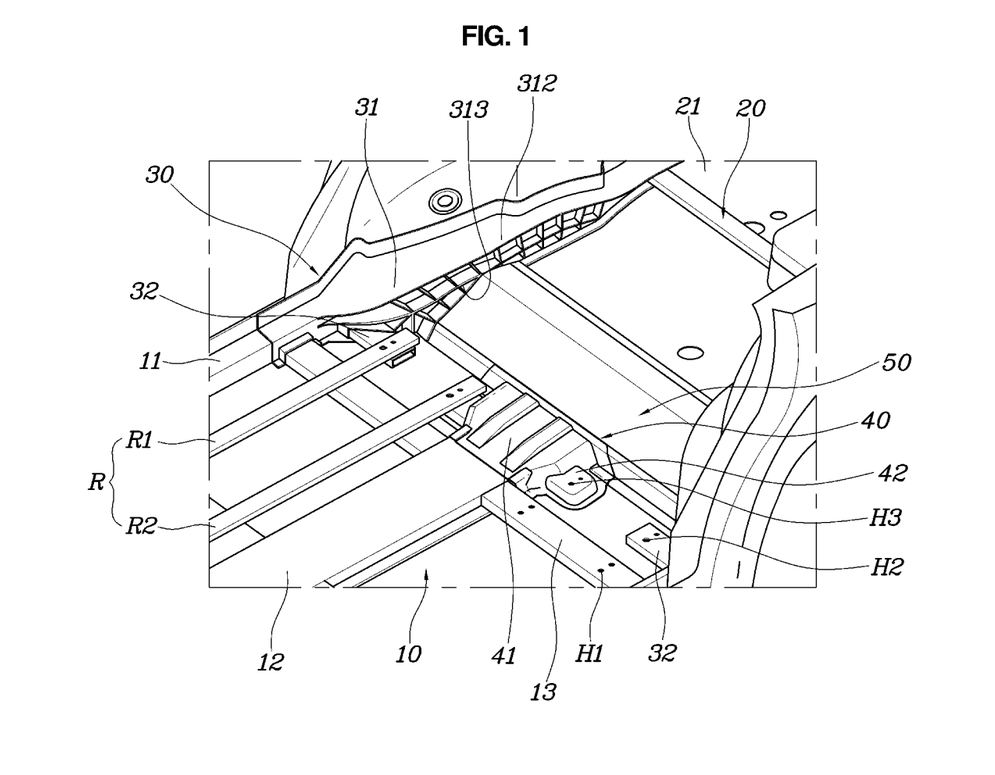
FIG. 1 is a view showing a body floor of a vehicle according to an embodiment of the present disclosure.
Figure 2:
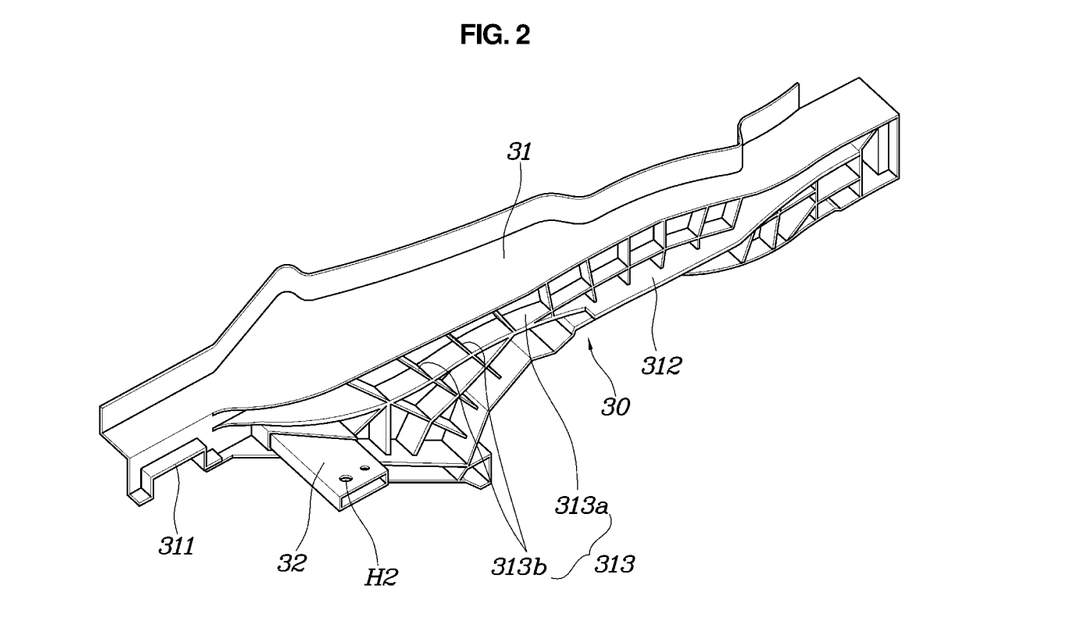
FIGS. 2 and 3 are views illustrating a side reinforcement member according to the body floor of a vehicle shown in FIG. 1.
Figure 3:
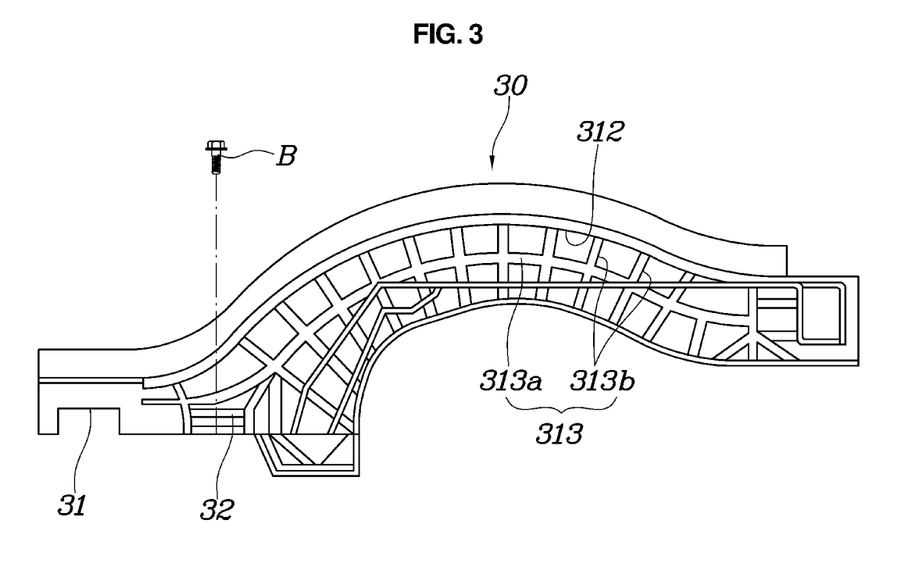
Figure 4:
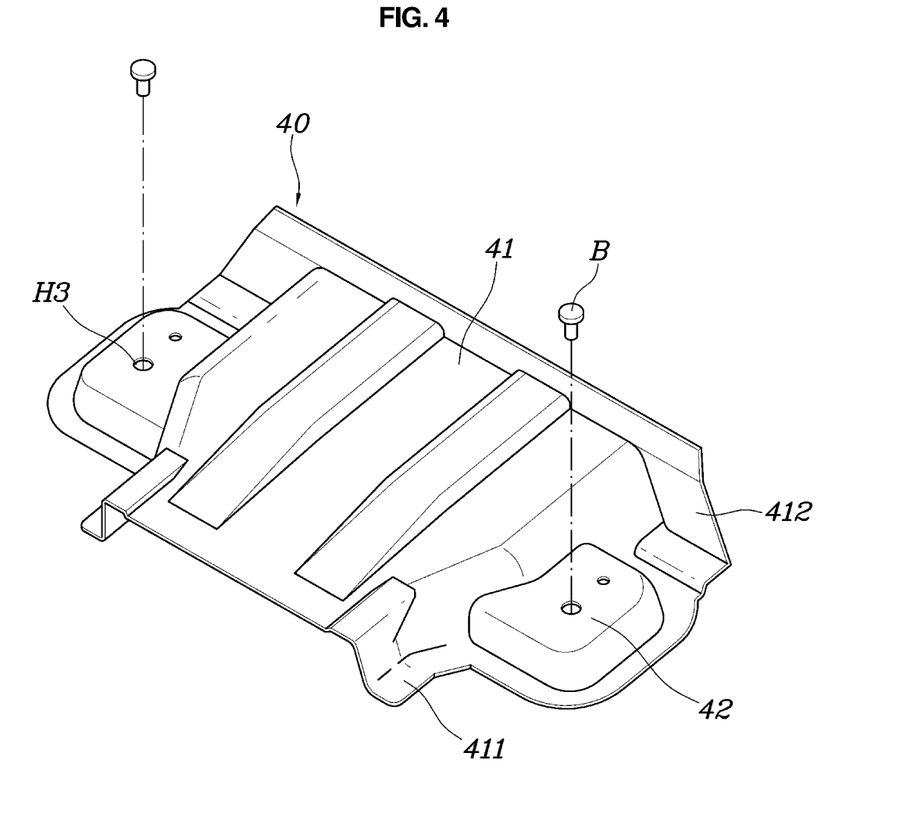
FIGS. 4 and 5 are views illustrating a center reinforcement member according to the body floor of a vehicle shown in FIG. 1.
Figure 5:
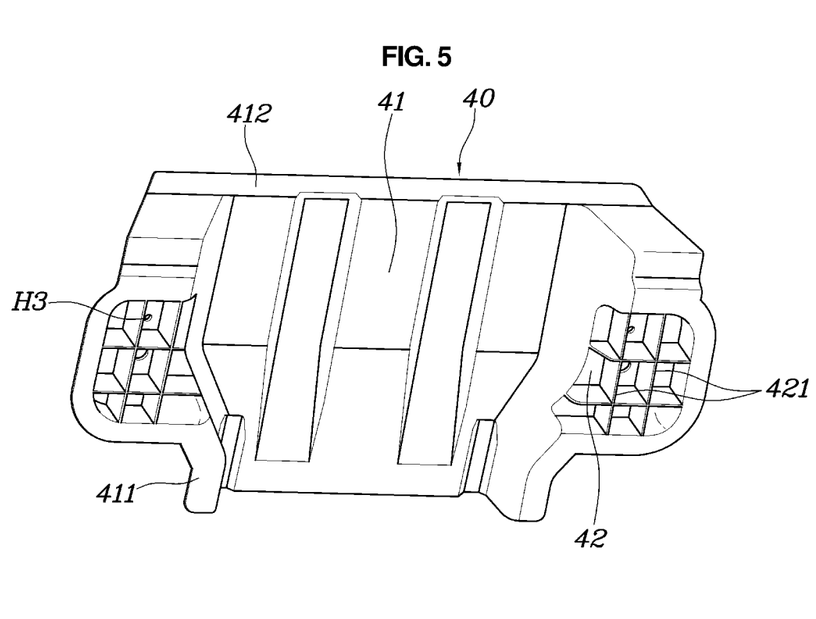

FIG. 1 is a view showing a body floor of a vehicle according to an embodiment of the present disclosure; FIGS. 2 and 3 are views illustrating a side reinforcement member according to the body floor of a vehicle shown in FIG. 1; and FIGS. 4 and 5 are views illustrating a center reinforcement member according to the body floor of a vehicle shown in FIG. 1.

The present disclosure relates to the body floor of a vehicle including seat rails R to which seats are mounted, and the body floor may be divided into a front floor, a center floor, and a rear floor. Here, the seat rails R are shown as a pair of seat rails that rear seats are safely mounted to. Though the seat rails are normally configured in a pair, three or more seat rails may be configured, and as described hereinbelow, installation positions of the side reinforcement member and the center reinforcement member may be changed in a vehicle body.

As shown in FIG. 1, the body floor of a vehicle according to the present disclosure includes: the center floor including center side members 11 provided on opposite sides thereof, a tunnel member 12 provided between the center side members 11 in forward/rearward directions, and a center cross-member 13 extending so as to allow each of the center side members 11 to be connected with the tunnel member 12 and having the pair of seat rails R mounted to the center cross-member 13; the rear floor 20 arranged on a rear of the center floor 10, the rear floor 20 having a rear side member 21 connected to the center side members 11 and being connected to the tunnel member 12; the side reinforcement member 30 provided between the center cross-member 13 and the rear floor 20 so as to cover the center side members 11 and the rear side member 21, the side reinforcement member 30 extending between the center cross-member 13 and the rear floor 20 so as to allow the center cross-member 13 and a first seat rail R1 to be mounted to the side reinforcement member 30; and a center reinforcement member 40 provided between the center cross-member 13 and the rear floor 20 so as to cover the tunnel member 12, the center reinforcement member 40 extending to the side reinforcement member 30 so as to allow the center cross-member 13 and a second seat rail R2 to be mounted to the center reinforcement member 40.

That is, though a body floor assembly of the present disclosure includes the center floor 10 and the rear floor 20, it may also include a front floor in front of the center floor 10, though the front floor is not shown in the drawings. Here, the center floor 10 includes the center side members 11 provided on opposite sides thereof and the tunnel member 12 provided on a middle part of a vehicle body between the center side members 11 so as to pass a muffler pipe through the tunnel member 12 in forward/rearward directions of the vehicle body. In addition, as the center floor 10 includes the center cross-member 13 extending toward the center side members 11 positioned on opposite sides of the tunnel member 12 relative thereto the tunnel member 12, the center side members 11 and the tunnel member 12 are connected to each other by the center cross-member 13, whereby rigidity of the body floor is ensured.

Meanwhile, the rear floor 20 is provided behind the rear of the center floor 10 and includes the rear side member 21 connected to the center side members 11. The center floor 10 and the rear floor 20 are combined with each other and may be configured to be integrated with each other. Accordingly, the rigidity of the body floor is ensured by each of the provided members.

Particularly, the present disclosure includes the side reinforcement member 30 and the center reinforcement member 40 so as to ensure rigidity of the center floor 10 and the rear floor 20. The side reinforcement member 30 and the center reinforcement member 40 are made of aluminum and thus may have sufficient rigidity with a reduced weight as compared to other materials such as steel.

That is, as the side reinforcement member 30 is configured to cover the center side members 11 and the rear side member 21, thereby reinforcing the rigidity of the center side members 11 and the rear side member 21. In addition, as the side reinforcement member 30 is configured to extend between the center cross-member 13 and the rear floor 20, the side reinforcement member 30 allows the first seat rail R1 to be mounted thereto by an extended part thereof. Accordingly, as the first seat rail R1 of the seat rails R is safely seated on and fixed to the center cross-member 13 and the side reinforcement member 30, the first seat rail R1 may be installed without an additional structure due to the center cross-member 13 and the side reinforcement member 30.

Meanwhile, the tunnel member 12 has the center reinforcement member 40 mounted thereto to cover an area positioned between the center cross-member 13 and the rear floor 20. The center reinforcement member 40 extends to the side reinforcement member 30, which reinforces rigidity of the tunnel member 12, and the second seat rail R2 is mounted to the center reinforcement member 40 by each of extended parts thereof. Accordingly, as the second seat rail R2 of the seat rails R is safely seated and fixed to the center cross-member 13 and the center reinforcement member 40, the second seat rail R2 may be installed without an additional structure due to the center cross-member 13 and the center reinforcement member 40.

Accordingly, while a pair of the seat rails R sits safely on the center cross-member 13, each of the seat rails is fixed to the side reinforcement member 30 and the center reinforcement member 40, respectively, whereby the pair of seat rails R may be mounted to the body floor without an additional structure. In addition, as the side reinforcement member 30 reinforces rigidity of each of the center side members and the rear side member, and the center reinforcement member 40 reinforces a center part of the body floor including the tunnel member 12, the rigidity of the body floor is ensured and durability thereof is improved.

Meanwhile, as shown in FIG. 1, the center floor 10 and the rear floor 20 are connected to each other by the kickup member 50, the kickup member 50 is connected to the rear floor 20 by extending in an inclined manner from a rear end portion of the center floor 10 to a rear of the body floor, and the center floor 10 and the rear floor 20 may have different heights.

The kickup member 50 is provided to be arranged between the center floor 10 and the rear floor 20 and to have an inclination, and thus during a vehicle collision, the center floor 10, the kickup member 50, and the rear floor 20 absorb the collision. Further, the center floor 10 and the rear floor 20 are connected to each other by the kickup member 50 having the inclination, and the center floor 10 and the rear floor 20 have different heights, so that a space in which a fuel tank is mounted to the rear floor 20 may be ensured by the height difference.

Meanwhile, as shown in FIGS. 1 to 3, the side reinforcement member 30 may include a body part 31 extending in forward/rearward directions so as to cover one of the center side members 11 and the rear side member 21, and a mounting part 32 extending from the body part 31 to an area positioned between the center cross-member 13 and the kickup member 50 and having the first seat rail R1 mounted thereto.

Accordingly, the side reinforcement member 30 includes the body part 31 and the mounting part 32, and the body part 31 extends in forward/rearward directions so as to cover the center side member 11 and the rear side member 21.

The body part 31 includes the mounting part 32 extending between the center cross-member 13 and the kickup member 50. As the mounting part 32 is required to have the first seat rail R1 sit thereon, the mounting part is configured in a polygon shape having a flat surface at an upper end thereof and has the same height as a height of the center cross-member 13. Accordingly, the mounting part 32 may be configured to have the same shape and height as a shape and height of the center cross-member 13 and thus the first seat rail R1 may safely sit on and be fixed to the mounting part 32.

Particularly, as shown in FIGS. 1 to 3, though the body part 31 extends to cover the center side member 11, the body part 31 extends to a portion of the body part 31 connected to the center cross-member 13 and may include a support groove 311 surrounding the center cross-member 13 while the body part 31 is mounted to the center side member 11 and the rear side member 21.

Though the body part 31 may be extended so as to cover all of the center side member 11 and the rear side member 21, when the body part 31 is excessively extended, rigidity of the body part may be decreased and manufacturing cost is increased. Accordingly, though the body part 31 extends to cover the rear side member 21 and the center side member 11, the body part 31 is configured to extend to a portion of the center cross-member 13 mounted to the center side member 11, and accordingly, the body part 31 may allow the rigidity of the rear side member 21, the center side member 11, and the portion of the center cross-member 13 connected to the center side member 11 to be ensured.

To this end, as the body part 31 includes the support groove 311 surrounding the center cross-member 13, when the body part 31 is mounted to the center side member 11 and the rear side member 21, the center cross-member 13 is inserted into the support groove 311 while the body part 31 covers the center side member 11 and the rear side member 21, whereby rigidity of connection parts of the center side member 11, the rear side member 21, and the center cross-member 13 is ensured.

Meanwhile, as shown in FIG. 3, the body part 31 includes a reinforcement part 312 provided therein by protruding therefrom to an inner side of the vehicle body so as to have an inner space in the reinforcement part 312, a protruding surface of the reinforcement part being open, wherein the reinforcement part 312 includes support ribs 313 intersecting with each other in the inner space.

That is, the reinforcement part 312 protruding to the inner side of the vehicle body in the body part 31 is configured to have an inner space, and the support ribs 313 are provided in the inner space, whereby the entire rigidity of the body part 31 is ensured. The reinforcement part 312 may protrude to the inner side of the vehicle body and be configured to correspond to shapes of the center floor 10, the kickup member 50, and the rear floor 20 so as to cover predetermined portions of the center floor 10, the rear floor 20, and the kickup member 50. Accordingly, when the body part 31 is mounted to the center side member 11 and the rear side member 21, the reinforcement part 312 may be in contact with the center floor 10, the kickup member 50, and the rear floor 20. Further, as the reinforcement part 312 protrudes to the inner side of the vehicle body and the protrusion surface to the inner side of the vehicle body is open, the support ribs 313 may occupy the inner space of the reinforcement part 312 so as to support a vertically directional weight.

The support ribs 313 may include main ribs 313a extending in forward/rearward directions of the body floor according to a shape of the reinforcement part 312 and assistant ribs 313b extending from the main ribs in vertical directions so as to be combined with inner surfaces of the reinforcement part.

As shown in FIG. 3, the support ribs 313 include the main ribs 313a and the assistant ribs 313b, and each of the main ribs 313a extends in the forward/rearward directions of the body floor according to the shape of the reinforcement part 312 and is connected to a front end and a rear end of the reinforcement part 312, and the plurality of assistant ribs 313b extend in the vertical directions relative to the main rib 313a, so that the assistant ribs 313b occupy the inner space and the rigidity of the reinforcement part 312 is ensured. The main ribs 313a and the assistant ribs 313b may be configured to have a radial shape or multiple sections according to an area of the inner space so as to reinforce rigidity of portions having low rigidity.

Accordingly, as the body part 31 includes the reinforcement part 312, and the support ribs 313 are provided in the inner space of the reinforcement part 312, the rigidity of the reinforcement part 312 is increased by the support ribs 313, and thus the entire rigidity of the body part 31 is ensured. Accordingly, the rigidity of the center side member 11 and the rear side member 21 to which the body part 31 is mounted is ensured.

Meanwhile, as shown in FIG. 1, as the center cross-member 13 includes the mount holes H1 to which the seat rails R are mounted and the mounting part 32 includes fixing holes H2 arranged in alignment with the mount holes H1, the first seat rail R1 may be mounted to the mount holes H1 and the fixing holes H2.

Accordingly, the center cross-member 13 includes the mount holes H1 provided thereon and the side reinforcement member 30 includes the fixing holes H2 provided thereon, and the mount holes H1 and the fixing holes H2 are arranged to be in alignment with each other in forward and rearward directions of a vehicle, and thus the first seat rail R1 of the seat rails R may be mounted to the mount holes H1 and the fixing holes H2. Here, as for the seat rail R, engaging bolts B pass through the seat rail R and are engaged to the mount holes H1 and the fixing holes H2, and thus the first seat rail R1 may be fixed to the center cross-member 13 and the side reinforcement member 30.

Accordingly, the first seat rail R1 sits and is fixed to the mounting part 32 of the side reinforcement member 30 reinforcing the rigidity of the center cross-member 13, the center side members 11, and the rear side member 21, whereby an additional structure for installing the first seat rail R1 is not required, the structure of the body floor is simplified, and manufacturing costs decreases.

Meanwhile, as shown FIGS. 1, 4, and 5, the center reinforcement member 40 is configured to cover the tunnel member 12 between the center cross-member 13 and the kickup member 50, and may include a cover part 41 provided thereon to be in contact with an inclined surface of the kickup member 50 and combination parts 42 extending to center side members 11 positioned on opposite sides of the cover part 41 from the cover part 41 and being in contact with the center floor 10.

In this way, the center reinforcement member 40 includes the cover part 41 and each of the combination parts 42, and as the cover part 41 is configured to cover the tunnel member 12, the cover part 41 may be configured to have a cover shape which is open in forward/rearward direction parts such that the tunnel member 12 passes through the cover part 41. In addition, the cover part 41 is configured to be in contact with the center cross-member 13 on a front end portion thereof and to be in contact with the inclined surface of the kickup member 50 on a rear end portion thereof, which allows a position of the cover part 41 to be securely fixed.

The cover part 41 includes combination parts 42 extending to the center side members 11 positioned on opposite sides thereof from the cover part 41 and being in contact with the center floor 10. Here, as the combination part 42 is required to have the second seat rail R2 safely seated thereon, the combination part 42 may be configured to have the same shape as the shape of the center cross-member 13, to have a flat surface at an upper surface thereof, and to have the same height as the height of the center cross-member 13. Accordingly, the second seat rail R2 may be safely seated on and fixed to the center cross-member 13 and the combination part 42 of the center reinforcement member 40.

Meanwhile, as shown in FIGS. 4 and 5, a lower end portion of the cover part 41 is outwardly bent and the cover part 41 may include a lower-end contact part 411 on the lower end portion, the lower-end contact part being in contact with the center floor 10.

That is, as the lower end portion of the cover part 41 is outwardly bent so as to have the lower-end contact part 411, the cover part 41 is configured to have a cross-section in the lower end portion thereof. Accordingly, when the cover part 41 is mounted to the tunnel member 12, the lower-end contact part 411 provided on the lower end portion of the cover part 41 is in surface contact with the center floor 10, and thus the cover part 41 may be safely supported by the center floor 10.

Further, since the rear end portion of the cover part 41 is outwardly bent so as to include a rear-end contact part 412 in contact with the inclined surface of the kickup member 50, the cover part may be safely supported by being in surface contact with the kickup member 50 via the rear-end contact part 412.

Accordingly, the cover part 41 includes the lower-end contact part 411 on the lower end portion thereof and the rear-end contact part 412 on the rear end portion thereof, thus when the cover part 41 is mounted to the tunnel member 12, the lower-end contact part 411 and the rear-end contact part 412 are in contact with the center floor 10 and the kickup member 50 respectively while the front end portion of the cover part 41 is in contact with the center cross-member 13, whereby a position of the cover part 41 may be safely fixed.

Meanwhile, as shown in FIG. 5, the combination part 42 is configured to have an inner space provided therein and may include reinforcement ribs 421 provided therein by being extended to intersect with each other in the inner space.

That is, as the combination part 42 is configured to have the inner space and includes the reinforcement ribs 421 in the inner space, the rigidity of the combination part 42 and the center reinforcement member 40 is ensured. As the combination part 42 is configured to have the inner space and be open on a lower end portion thereof, the combination part sits on the center floor 10 to close the lower end portion thereof and the reinforcement ribs 421 provided in the inner space are configured to occupy the inner space, whereby the rigidity of the combination part 42 is ensured.

Particularly, while the center reinforcement member 40 is mounted to the tunnel member 12, the reinforcement ribs 421 provided in the inner space of the combination part 42 are configured to be in contact with the center floor 10, whereby the rigidity of the combination part 42 is ensured and moisture on the center floor 10 is introduced into the combination part 42 so as to prevent the moisture from reaching portions to which the seat rails R are mounted.

Meanwhile, as shown in FIG. 1, the center cross-member 13 includes the mount holes H1 provided thereon to which the seat rails R are mounted, and the combination part 42 includes the combination holes H3 provided thereon to be arranged in alignment with the mount holes H1, and the second seat rail R2 may be mounted to the mount holes H1 and the combination holes H3.

Accordingly, the center cross-member 13 includes the mount holes H1 provided thereon, and the combination part 42 of the center reinforcement member 40 includes the combination holes H3 provided thereon. The mount holes H1 and the combination holes H3 are arranged to be in alignment with each other in forward/rearward directions of the vehicle, and accordingly, the second seat rail R2 of the seat rails R may be fixed to the mount holes H1 and the combination holes H3. Here, as the second seat rail R2 is engaged to the mount holes H1 and the combination holes H3 by the engaging bolts B passing through the second seat rail R2, the second seat rail R2 may be fixed to the center cross-member 13 and the center reinforcement member 40.

Accordingly, as the second seat rail R2 in cooperation with the center cross-member 13 is safely seated on and fixed to the center reinforcement member 40 reinforcing rigidity of the tunnel member 12, an additional structure for installing the second seat rail R2 is not required, which simplifies the structure of the body floor and decreases manufacturing cost.

The body floor of a vehicle having the structure mentioned above allows rigidity of peripheral parts of the center floor, the rear floor, and the tunnel member 12 to be ensured by the side reinforcement member 30 and the center reinforcement member 40, and the center floor and the rear floor thereof provide the installation structure of the seat rails R, which simplifies the structure of the body floor, whereby the number of parts and manufacturing costs are decreased.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A body floor of a vehicle including seat rails having seats mounted thereto, the body floor comprising:
    a center floor including center side members provided on opposite sides of the center floor, a tunnel member provided between the center side members in forward/rearward directions, and a center cross-member extending so as to allow the center side members to be connected to the tunnel member and having a first seat rail and a second seat rail each mounted to the center cross-member;
    a rear floor arranged on a rear of the center floor, the rear floor having a rear side member connected to the center side members and being connected to the tunnel member;
    a side reinforcement member provided between the center cross-member and the rear floor so as to cover the center side members and the rear side member, the side reinforcement member extending between the center cross-member and the rear floor so as to allow the center cross-member and the first seat rail to be mounted to the side reinforcement member; and
    a center reinforcement member provided between the center cross-member and the rear floor so as to cover the tunnel member, the center reinforcement member extending toward the side reinforcement member so as to allow the center cross-member and the second seat rail to be mounted to the center reinforcement member.

2. The body floor of claim 1, wherein the center floor and the rear floor are connected to each other by a kickup member, the kickup member is connected to the rear floor by extending in an inclined manner from a rear end portion of the center floor to a rear of the body floor, and the center floor and the rear floor have different heights.

3. The body floor of claim 2, wherein the side reinforcement member includes:
    a body part extending in forward/rearward directions so as to cover one of the center side members and the rear side member; and
    a mounting part extending from the body part to an area positioned between the center cross-member and the kickup member and having the first seat rail mounted thereto.

4. The body floor of claim 3, wherein the body part extends to cover the one of the center side members by extending up to a portion at which the body part is connected to the center cross-member, with a support groove being provided in the body part so as to surround the center cross-member while the body part is mounted to the one of the center side members and the rear side member.

5. The body floor of claim 3, wherein the body part includes a reinforcement part provided therein by protruding therefrom to an inner side of a vehicle body so as to have an inner space in the reinforcement part, with a protruding surface of the reinforcement part being open, wherein the reinforcement part includes support ribs intersecting with each other in the inner space.

6. The body floor of claim 5, wherein the reinforcement part is configured to protrude to the inner side of the vehicle body and extend so as to cover predetermined portions of the center floor, the rear floor, and the kickup member.

7. The body floor of claim 5, wherein the support ribs include main ribs extending in forward/rearward directions of the body floor according to a shape of the reinforcement part, and assistant ribs extending from the main ribs in vertical directions so as to be combined with inner surfaces of the reinforcement part.

8. The body floor of claim 2, wherein a mounting part is configured in a polygon shape having a flat surface at an upper end thereof and has the same height as a height of the center cross-member.

9. The body floor of claim 2, wherein the center cross-member includes mount holes provided thereon, wherein the seat rails are mounted to the mount holes, and a mounting part includes fixing holes provided thereon, the fixing holes being arranged to be in alignment with the mount holes, whereby the first seat rail is mounted to the mount holes and the fixing holes.

10. The body floor of claim 2, wherein the center reinforcement member is configured to cover the tunnel member between the center cross-member and the kickup member, the center reinforcement member including a cover part provided thereon to be in contact with an inclined surface of the kickup member and combination parts extending to the center side members positioned on opposite sides of the cover part from the cover part and being in contact with the center floor.

11. The body floor of claim 10, wherein a lower end portion of the cover part is outwardly bent so as to have a lower-end contact part thereof being in contact with the center floor.

12. The body floor of claim 10, wherein a rear end portion of the cover part is outwardly bent so as to have a rear-end contact part thereof being in contact with the inclined surface of the kickup member.

13. The body floor of claim 10, wherein each of the combination parts is configured to have an inner space provided therein and includes reinforcement ribs provided in the inner space, the reinforcement ribs extending to intersect with each other in the inner space.

14. The body floor of claim 10, wherein each of the combination parts is configured to have a flat surface at an upper surface thereof and have the same height as a height of the center cross-member.

15. The body floor of claim 10, wherein the center cross-member includes mount holes provided thereon to which the seat rails are mounted, and each of the combination parts includes combination holes provided thereon to be arranged in alignment with the mount holes, so that the second seat rail is mounted to the mount holes and the combination holes.

16. The body floor of claim 1, wherein the side reinforcement member and the center reinforcement member include flat surfaces that are in contact with the center floor.

17. The body floor of claim 1, wherein the side reinforcement member and the center reinforcement member are made of aluminum.

\* \* \* \* \*